(12) United States Patent
Yoo

(10) Patent No.: US 11,842,334 B2
(45) Date of Patent: Dec. 12, 2023

(54) SMART CARD FOR GENERATING VIRTUAL CARD NUMBER, AND METHOD AND PROGRAM FOR PROVIDING SMART CARD-BASED VIRTUAL CARD NUMBER

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 431 days.

(21) Appl. No.: 16/784,195

(22) Filed: Feb. 6, 2020

(65) Prior Publication Data
US 2020/0202329 A1   Jun. 25, 2020

Related U.S. Application Data

(63) Continuation of application No. PCT/KR2018/000868, filed on Jan. 18, 2018.

(30) Foreign Application Priority Data

Aug. 9, 2017   (KR) .................. 10-2017-0100953
Nov. 10, 2017   (KR) .................. 10-2017-0149153

(51) Int. Cl.
*G06Q 20/36*   (2012.01)
*G06Q 20/06*   (2012.01)
(Continued)

(52) U.S. Cl.
CPC .......... *G06Q 20/3672* (2013.01); *G06F 8/30* (2013.01); *G06F 21/31* (2013.01); *G06F 21/606* (2013.01);
(Continued)

(58) Field of Classification Search
CPC .......... G06Q 20/3672; G06Q 20/0658; G06Q 20/3274; G06Q 20/3278; G06Q 20/351;
(Continued)

(56) References Cited

U.S. PATENT DOCUMENTS 4,802,218 A  *  1/1989  Wright ............... G06Q 20/3676
                                                    235/487
2009/0199278 A1*  8/2009  Song .................. H04W 12/068
                                                    726/6
(Continued)

FOREIGN PATENT DOCUMENTS

CN       101299662 A  * 11/2008
KR       10-1316466 B1    10/2013
(Continued)

OTHER PUBLICATIONS

International Search Report issued in PCT/KR2018/000868; dated May 21, 2018.

*Primary Examiner* — Zeshan Qayyum
(74) *Attorney, Agent, or Firm* — Studebaker & Brackett PC

(57) ABSTRACT

The present invention relates to a smart card for generating a virtual card number, and smart card-based virtual card number providing method and program.
A smart card-based virtual card number providing method according to an embodiment of the present invention comprises: a step for a virtual card number generation module receiving a virtual card number provision request; a step for the virtual card number generation module synchronizing the time of an encryption algorithm and the smart card; a virtual card number generating step for the virtual card number generation module generating a virtual card number; a step for the virtual card number generation module generating the virtual card number as an encryption code on the basis of the synchronized encryption algorithm; and a step for the virtual card number generation module transmitting the encryption code to the smart card.

3 Claims, 12 Drawing Sheets

(51) Int. Cl.
*G06Q 20/40* (2012.01)
*G06Q 20/34* (2012.01)
*G06Q 40/02* (2023.01)
*H04L 9/40* (2022.01)
*H04L 9/32* (2006.01)
*G06F 8/30* (2018.01)
*G06Q 20/32* (2012.01)
*G06Q 20/38* (2012.01)
*G06F 21/31* (2013.01)
*H04W 12/033* (2021.01)
*G06F 21/60* (2013.01)

(52) U.S. Cl.
CPC ..... *G06Q 20/0658* (2013.01); *G06Q 20/3274* (2013.01); *G06Q 20/3278* (2013.01); *G06Q 20/351* (2013.01); *G06Q 20/354* (2013.01); *G06Q 20/3674* (2013.01); *G06Q 20/382* (2013.01); *G06Q 20/385* (2013.01); *G06Q 20/4093* (2013.01); *G06Q 40/02* (2013.01); *H04L 9/3213* (2013.01); *H04L 9/3228* (2013.01); *H04L 63/0428* (2013.01); *H04W 12/033* (2021.01); *H04L 2209/56* (2013.01); *H04L 2209/80* (2013.01)

(58) Field of Classification Search
CPC ............. G06Q 20/354; G06Q 20/3674; G06Q 20/382; G06Q 20/385; G06Q 20/4093; G06Q 40/02; G06Q 20/326; G06Q 20/3821; G06F 8/30; G06F 21/31; G06F 21/606; G06F 21/30; H04L 9/3213; H04L 9/3228; H04L 63/0428; H04L 2209/56; H04L 2209/80; H04L 63/0807; H04L 9/3234; H04L 63/0838; H04L 2463/102; H04W 12/033
USPC ........................................................ 705/66
See application file for complete search history.

(56) References Cited

U.S. PATENT DOCUMENTS

| 2012/0143759 A1* | 6/2012 | Ritorto, Jr. | G06Q 20/40 705/44 |
| 2015/0134540 A1* | 5/2015 | Law | G06Q 20/229 705/72 |
| 2015/0142657 A1* | 5/2015 | Sagastiverza | G06Q 20/351 705/44 |

FOREIGN PATENT DOCUMENTS

| KR | 20140097832 A | * | 8/2014 | ............ G06Q 20/227 |
| KR | 20140097832 A | * | 8/2014 | ............ G06Q 20/227 |
| KR | 10-2014-0105683 A | | 9/2014 | |
| KR | 10-2016-0119296 A | | 10/2016 | |
| KR | 10-1675927 B1 | | 11/2016 | |
| KR | 10-2017-0040469 A | | 4/2017 | |

* cited by examiner

SMART CARD FOR GENERATING VIRTUAL CARD NUMBER, AND METHOD AND PROGRAM FOR PROVIDING SMART CARD-BASED VIRTUAL CARD NUMBER

CROSS-REFERENCE TO RELATED APPLICATIONS

The present application is a continuation of International Patent Application No. PCT/KR2018/000868, filed on Jan. 18, 2018 which is based upon and claims the benefit of priority to Korean Patent Application Nos. 10-2017-0100953 filed on Aug. 9, 2017 and 10-2017-0149153 filed on Nov. 10, 2017. The disclosures of the above-listed applications are hereby incorporated by reference herein in their entirety.

BACKGROUND

Embodiments of the inventive concept described herein relate to a smart card generating a virtual card number and a smart card-based virtual card number providing method and program.

Data of a code type is used in a lot of areas. In addition to the card number or account number used to make a payment, the data of a code type includes an IPIN number, a resident registration number, or the like for user identification.

However, the code data may be leaked when this code data is used. In the case of a card number, because the actual card number is recorded on the card surface as it is, the actual card number is visually exposed to other people. Upon making a payment using a magnet, the card number is leaked to other people while being transmitted to a POS device.

The virtual card number was used to prevent the actual card number from being leaked. However, data for identifying a user is needed to search for the actual card number corresponding to the virtual card number. For example, the code of One Time Password (OTP) is changed and generated every time. However, in the case of OTP, a login procedure is needed to determine the algorithm assigned to the user, and it is difficult for OTP to be applied to various areas.

Accordingly, there is a need for a device capable of searching for the actual card number based on the virtual card number changed in real time, while not providing the identification information about a user or a device corresponding to the actual card number.

SUMMARY

When making an offline financial transactions, the users are accustomed to making financial transactions by providing a card to a counterpart or inserting a card into a device. At this time, when losing a smart card including a virtual card number generation algorithm, the users may not prevent others from making a payment, as in the case that users lose a normal card.

Embodiments of the inventive concept provide a smart card and a smart card-based virtual card number providing method and program that may prevent others from making financial transactions upon losing a smart card outputting a virtual card number to an external device when receiving data used to generate a virtual card number or a virtual card number from a mobile terminal of a user and may generate a virtual card number.

Embodiments of the inventive concept provide a smart card and a smart card-based virtual card number providing method and program that may not generate a usable virtual card number and then may not make financial transactions even though someone intercepts data that is generated in real time and provided from a mobile terminal to the smart card and may generate a virtual card number.

The technical problems to be solved by the present inventive concept are not limited to the aforementioned problems, and any other technical problems not mentioned herein will be clearly understood from the following description by those skilled in the art to which the inventive concept pertains.

According to an exemplary embodiment, a smart card-based virtual card number providing method includes receiving, by a virtual card number generation module, a virtual card number provision request depending on activation of a smart card of a user, synchronizing, by the virtual card number generation module, time of an encryption algorithm with the smart card, generating, by the virtual card number generation module, a virtual card number, generating, by the virtual card number generation module, the virtual card number as an encryption code based on the synchronized encryption algorithm, and transmitting, by the virtual card number generation module, the encryption code to the smart card. The virtual card number is generated for each unit count by means of a virtual card number generating function. The virtual card number generation module is included in an application installed in a mobile terminal and includes the same virtual card number generating function as a virtual card number generating function included in a virtual card number verification server, and the unit count is set to a specific time interval and is changed as the time interval elapses.

Furthermore, in another exemplary embodiment, the generating of the virtual card number includes generating, by the virtual card number generation module, a plurality of detailed codes by means of a plurality of detailed code generating functions, and combining, by the virtual card number generation module, the plurality of detailed codes by means of a detailed code combining function to generate the combined detailed code as the virtual card number. The detailed code generating functions and the detailed code combining function are included in the virtual card number generating function. The plurality of detailed codes include a first code for setting a start point of search of a storage location and a second code for setting a search path from the start point to the storage location depending on a specific search method.

Moreover, in another exemplary embodiment, the encryption algorithm is matched with an encryption rule every hour.

Also, in another exemplary embodiment, the method further includes generating, by the virtual card number generation module, a virtual security code, using a virtual security code generating function. The virtual security code is a one-time code generated using a time value and a card security code of an actual card number, and the detailed code generating functions generate the detailed codes, using the virtual security code, respectively.

In addition, in another exemplary embodiment, the method further includes obtaining, by the virtual card number generation module, an identification value of the smart card during usage registration of the smart card. The generating of the virtual card number as the encryption code includes generating a one-time code for code conversion, using time data synchronized with the identification value and converting the virtual card number into the encryption code by applying a conversion pattern corresponding to the one-time code for code conversion.

According to an exemplary embodiment, a smart card-based virtual card number providing method includes generating, by a first virtual card number generation module, a virtual security code, using a time value and a card security code of an actual card number and transmitting, by the first virtual card number generation module, the virtual security code to a smart card. The virtual security code is a one-time code of a specific digit. The first virtual card number generation module is included in an application installed in a mobile terminal. The smart card includes a second virtual card number generation module. The second virtual card number generation module generates a plurality of detailed codes matched with a unit count at which generation of a virtual card number is requested, using the virtual security code, combines the plurality of detailed codes to generate the virtual card number, and outputs the virtual card number to an outside. The unit count is set to a specific time interval and is changed as the time interval elapses.

Furthermore, in another exemplary embodiment, the method further includes receiving, by the first virtual card number generation module, a virtual card number provision request depending on activation of the smart card of a user.

Moreover, in another exemplary embodiment, the plurality of detailed codes include a first code generated based on a first count and a second code generated based on a second count. The first count is the number of unit counts elapsing from a first time at which a virtual card number generating function is driven by a virtual card number verification server. The second count is the number of unit counts elapsing from a point in time at which an actual card number of a specific user is issued. The second virtual card number generation module applies the virtual security code as the second count or the number of counts elapsing from a current time point.

Also, in another exemplary embodiment, the virtual security code is used to determine whether a virtual card number transmitted through the smart card is generated normally, in a virtual card number verification server.

In addition, in another exemplary embodiment, the method further includes receiving, by the first virtual card number generation module, a smart card registration request from a user, receiving, by the first virtual card number generation module, an identification value of the smart card from the user, and providing, by the first virtual card number generation module, installation data to the smart card. The installation data includes the second virtual card number generation module.

Furthermore, in another exemplary embodiment, the virtual card number is generated by combining a fixed code and a plurality of detailed codes depending on a specific rule, and the fixed code is a code that is combined at a predetermined location in the virtual card number and determines a card issuer or a card type corresponding to the actual card number.

According to an exemplary embodiment, a smart card-based virtual card number providing method includes receiving, by a second virtual card number generation module, a virtual security code from a first virtual card number generation module, generating, by the second virtual card number generation module, a plurality of detailed codes by means of a plurality of detailed code generating functions, combining, by the second virtual card number generation module, the plurality of detailed codes by means of a detailed code combining function to generate the combined detailed code as a virtual card number, and outputting, by the second virtual card number generation module, a virtual card number through an output means included in a smart card. The virtual card number is generated for each unit count by a virtual card number generating function. The virtual card number generating function includes the detailed code generating functions and the detailed code combining function. The first virtual card number generation module is included in an application installed in a mobile terminal linked with the smart card. The second virtual card number generation module includes the same virtual card number generating function as a virtual card number generating function included in a virtual card number verification server and is installed in the smart card by means of installation data provided from the application to the smart card. The unit count is set to a specific time interval and is changed as the time interval elapses.

Moreover, in another exemplary embodiment, the plurality of detailed codes include a first code generated based on a first count and a second code generated based on a second count. The first count is the number of unit counts elapsing from a first time at which the virtual card number generating function is driven by the virtual card number verification server. The second count is the number of unit counts elapsing from a point in time at which an actual card number of a specific user is issued. The generating of the plurality of detailed codes include applying the virtual security code as the second count or the number of counts elapsing from a current time point.

According to an exemplary embodiment, a smart card-based virtual card number providing program is stored in a medium to execute the above-described smart card-based virtual card number providing method in combination with a computer that is a piece of hardware.

According to an exemplary embodiment, a smart card generating a virtual card number includes a virtual security code reception unit receiving a virtual security code from a mobile terminal, a detailed code generation unit generating a plurality of detailed codes based on the virtual security code, a virtual card number generation unit combining the plurality of detailed codes to generate the combined detailed code as a virtual card number, and a virtual card number provision unit outputting the virtual card number to an outside to provide the virtual card number to a virtual card number verification server. The virtual card number is differently generated for each unit count by a virtual card number generating function. The unit count is set to a specific time interval and is changed as the time interval elapses. The virtual card number generating function includes a detailed code generating function and a detailed code combining function. The plurality of detailed codes include a first code generated based on a first count and a second code generated based on a second count. The first count is the number of unit counts elapsing from a first time at which the virtual card number generating function is driven by the virtual card number verification server. The second count is the number of unit counts elapsing from a point in time at which an actual card number of a specific user is issued. The detailed code generation unit applies the virtual security code as the second count or the number of counts elapsing from a current time point.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
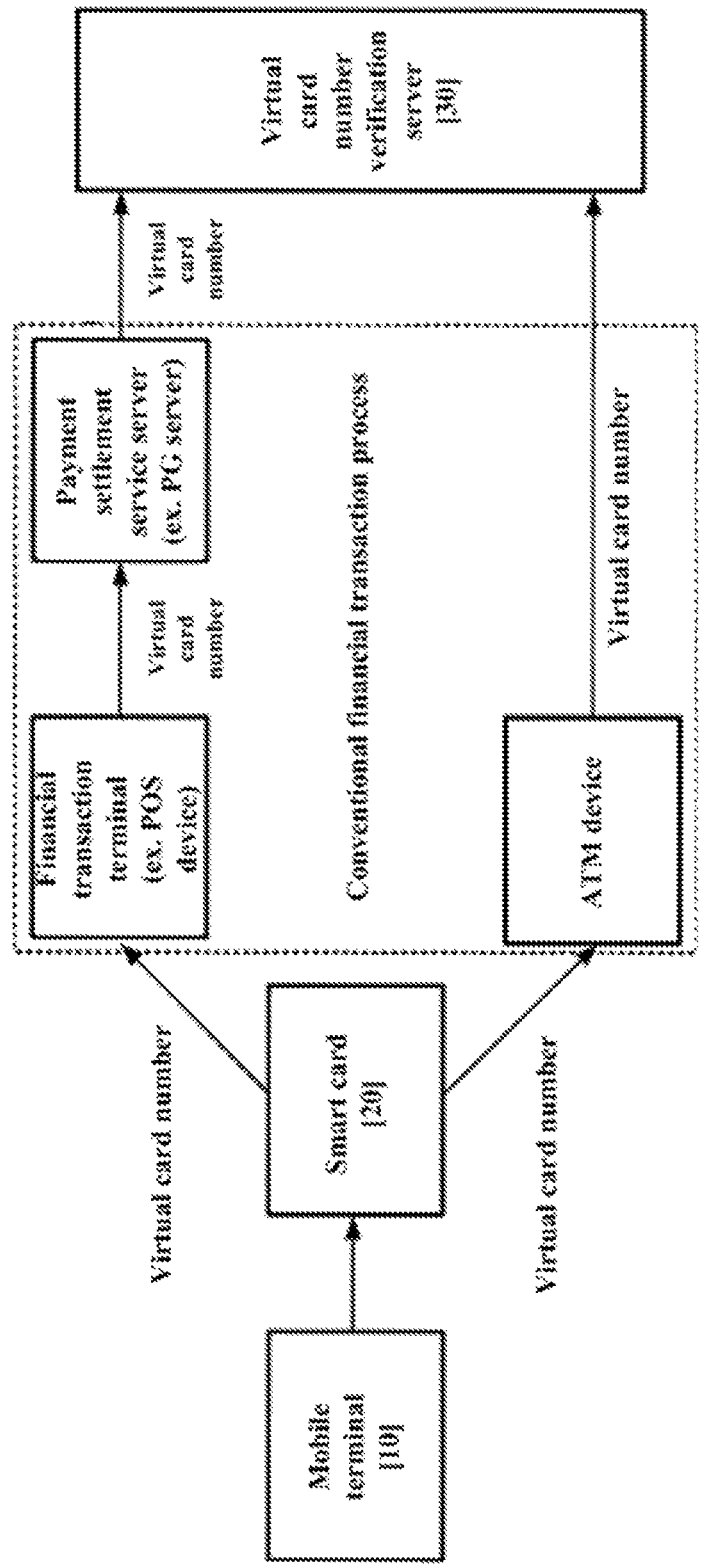
FIG. 1 is a block diagram of a smart card-based virtual card number providing system, according to an exemplary embodiment of the inventive concept.

Hereinafter, exemplary embodiments of the inventive concept will be described in detail with reference to the accompanying drawings. The above and other aspects, features and advantages of the invention will become apparent from the following description of the following exemplary embodiments given in conjunction with the accompanying drawings. However, the inventive concept is not limited to the exemplary embodiments disclosed below, but may be implemented in various forms. The exemplary embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terminology used herein is for the purpose of describing exemplary embodiments and is not intended to limit the inventive concept. In the specification, the singular forms include plural forms unless particularly mentioned. The terms "comprises" and/or "comprising" used herein does not exclude presence or addition of one or more other elements, in addition to the aforementioned elements.

In this specification, 'financial transaction' refers to the procedure that takes place between finance companies. The 'financial transaction' includes card payments, deposits or withdrawals from a bank account, or the like.

In this specification, a 'character' is a component of a code and includes all or part of uppercase alphabet characters, lowercase alphabet characters, numerals, and special characters.

In this specification, a 'code' refers to a string of characters.

In this specification, a 'card number' is used for a financial transaction such as a payment, or the like and refers to the number issued to a card and delivered to a card issuer in the case of a payment, the cancellation of a payment, or the like.

In this specification, an 'actual card number' is the number issued by the card issuer to the card of a specific user. That is, the 'actual card number' may mean a number issued for a general actual card, a mobile card, or the like.

In this specification, a 'virtual card number' may be a card number temporarily generated to be connected to the actual card number and may be a code of specific digits composed of characters including numbers.

In this specification, a 'detailed code' refers to a part of codes included in the virtual card number. That is, when the virtual card number is generated by combining the separately generated a plurality of code, the detailed code refers to a respective code constituting the virtual card number after the respective code is separately generated. That is, the virtual card number may be generated by combining a plurality of detailed codes depending on the specific rule.

In this specification, the 'unit count' is a unit set to a specific time interval and is defined to change as the time interval elapses. For example, 1 count may be used after being set to a specific time interval (e.g., 1.5 seconds).

In this specification, a 'virtual card number generating function' refers to the function used to generate the virtual card number.

In this specification, a 'detailed code generating function' refers to the function of generating each detailed code constituting the virtual card number.

In this specification, the 'detailed code combining function' refers to a function that generates a virtual card number by combining or coupling a plurality of detailed codes. When another code is included in addition to the detailed code (e.g., a fixed code, or the like), the 'detailed code combining function' generates a virtual card number by combining not only the detailed code but also the other code together.

In this specification, a 'smart card' refers to a card capable of changing and outputting a card number.

In this specification, a 'virtual security code' refers to a one-time code having the specific number of digits, which is used to generate a virtual card number (especially, a detailed code).

In this specification, a 'mobile terminal' includes all various devices capable of providing results to a user by performing arithmetic processing. For example, the computer may correspond to not only a desktop personal computer (PC) or a notebook but also a smart phone, a tablet PC, a cellular phone, a personal communication service phone (PCS phone), a mobile terminal of a synchronous/asynchronous International Mobile Telecommunication-2000 (IMT-2000), a palm PC, a personal digital assistant (PDA), and the like.

In this specification, a 'virtual card number generation module' refers to a module that generates a virtual card number in the form provided to a virtual card number verification server. The virtual card number generation module may be divided into a plurality of detailed modules depending on a role to be performed. The detailed module included in the virtual card number generation module may be included in a single terminal device or separately included in a separate terminal device.

In this specification, the 'first virtual card number generation module' refers to a module that generates a virtual security code used to generate a virtual card number.

In this specification, the 'second virtual card number generation module' refers to a module that generates a virtual card number, using the virtual security code generated by the first virtual card number generation module. That is, the 'second virtual card number generation module' includes a detailed code generating function and a detailed code combining function.

Hereinafter, according to an exemplary embodiment of the inventive concept, the configuration of the actual card number will be described to explain the process of generating a virtual card number to substitute the actual card number and the process of searching for an actual card number.

The 'actual card number' includes at least one of a card identification number, a card security code, or an expiration date. The card identification number is the code assigned to identify a card issuer, a card type, and a user of a card. Generally, the card identification number provided to a card has 15 or 16 digits. Moreover, In general, in the case of the card identification number of 16 digits, the first six digits are composed of the issuer identification number (IIN) of the card; the digits from the seventh digit to the fifteenth digit are composed of code provided by each card issuer to each card depending on an arbitrary rule; the 16th digit is composed of a value for verifying the card identification number by a specific formula.

The card security code is composed of the numbers on specific digits (e.g., 3 digits in the case of Visa or Master card and 4 digits in the case of AMEX card) printed on one side of the card, and is a code for determining whether the card number is normal. That is, in the case where the card security code has 3 digits and the card identification number has 16 digits, when 3-digit code being the card security code and 16-digit code being the card identification number are encrypted/decrypted depending on a predetermined rule and then the card is a normal card, when the corresponding value is matched. The card security code is referred to as a Card Verification Value (CVV) for Visa, Card Validation Code (CVC) for Master Card/JCB, and Confidential Identifier Number or Card Identification Number (CID) or American Express.

The expiration date refers to the date usable after which the actual card number is issued. Generally, the expiration date is composed of four digits having two digits for each year or month. Because the magnetic card includes the actual card number as it is, the whole card number may be leaked by only reading out the magnetic card. The use of magnetic cards has been recently restricted over the world, and the magnetic card is being converted into a high-security card like an IC card. For the purpose of applying other high-security methods, a new terminal needs to be installed or the magnetic card needs to be changed to be different from the conventional process. Accordingly, a method for preventing a card number leakage is needed while the same process is applied using the conventional actual card number. In particular, it is necessary to improve security while the conventional magnetic card reader is used as it.

Hereinafter, a smart card-based virtual card number providing method and program and a virtual card number providing smart card according to an exemplary embodiment of the inventive concept will be described in detail with reference to the accompanying drawings.

FIG. 1 is a block diagram of a smart card-based virtual card number providing system, according to an exemplary embodiment of the inventive concept.

Referring to FIG. 1, a smart card-based virtual card number providing system according to an exemplary embodiment of the inventive concept includes a mobile terminal 10, a smart card 20, and a virtual card number verification server 30.

The mobile terminal 10 generates a virtual card number to provide the virtual card number to the smart card 20 or generates the virtual security code used to generate the virtual card number to provide the virtual security code to the smart card 20. An application is installed in the mobile terminal 10 including a module (i.e., the first virtual card number generation module 110 being a single module included in the virtual card number generation module 100 in the case where the virtual card number itself is generated or in the virtual card number generation module 100 in the case where a virtual security code is generated) for generating a virtual card number or a virtual security code.

The smart card 20 receives the virtual card number from the mobile terminal 10 to provide the virtual card number to a financial transaction terminal or generates the virtual card number using the virtual security code provided from the mobile terminal 10 to provide the virtual card number to the financial transaction terminal.

The virtual card number verification server 30 refers to a server that receives a virtual card number provided to a financial transaction terminal, searches for an actual card number, and makes a financial transaction. For example, the virtual card number verification server 30 may be a financial company server that receives the virtual card number, which is received from the financial transaction terminal, from the PG server and searches for the actual card number.

Figure 2:
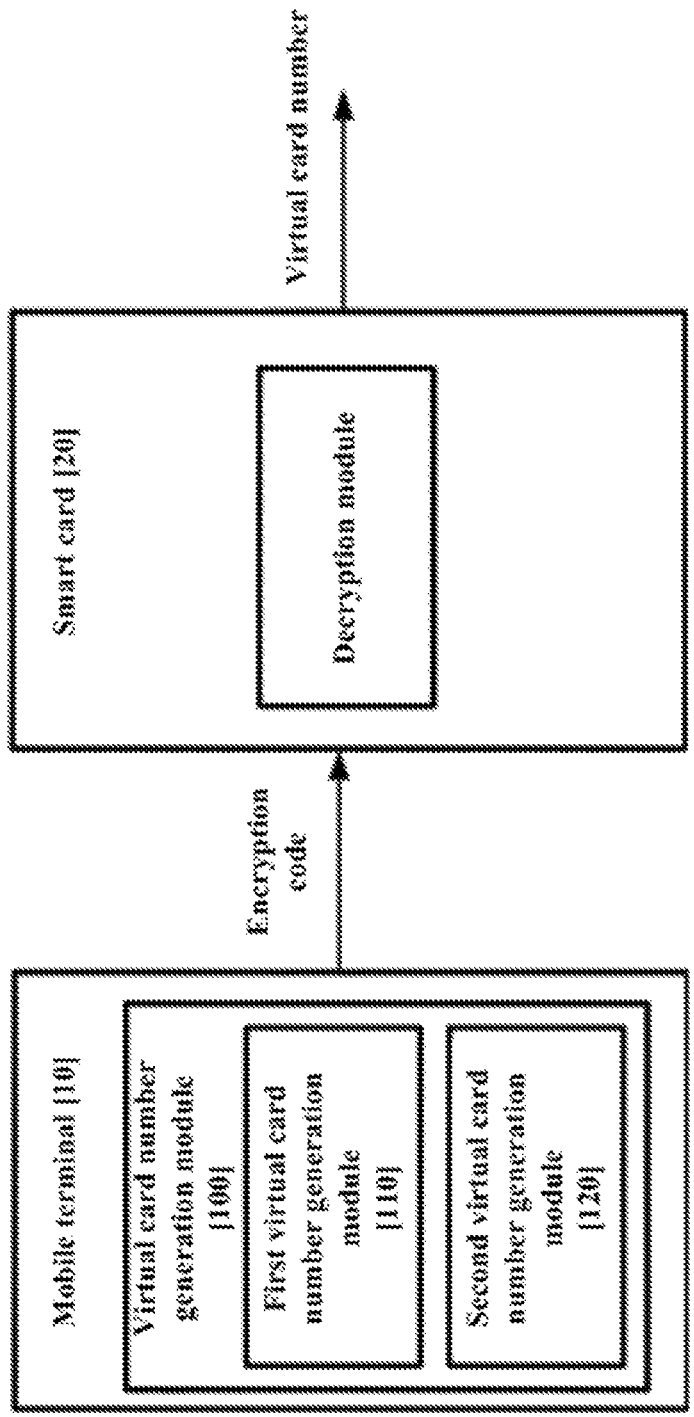
FIG. 2 is a system configuration diagram between a mobile terminal and a smart card, according to an exemplary embodiment of the inventive concept.

FIG. 2 is a system configuration diagram between the mobile terminal 10 and the smart card 20, according to an exemplary embodiment of the inventive concept.

Figure 3:
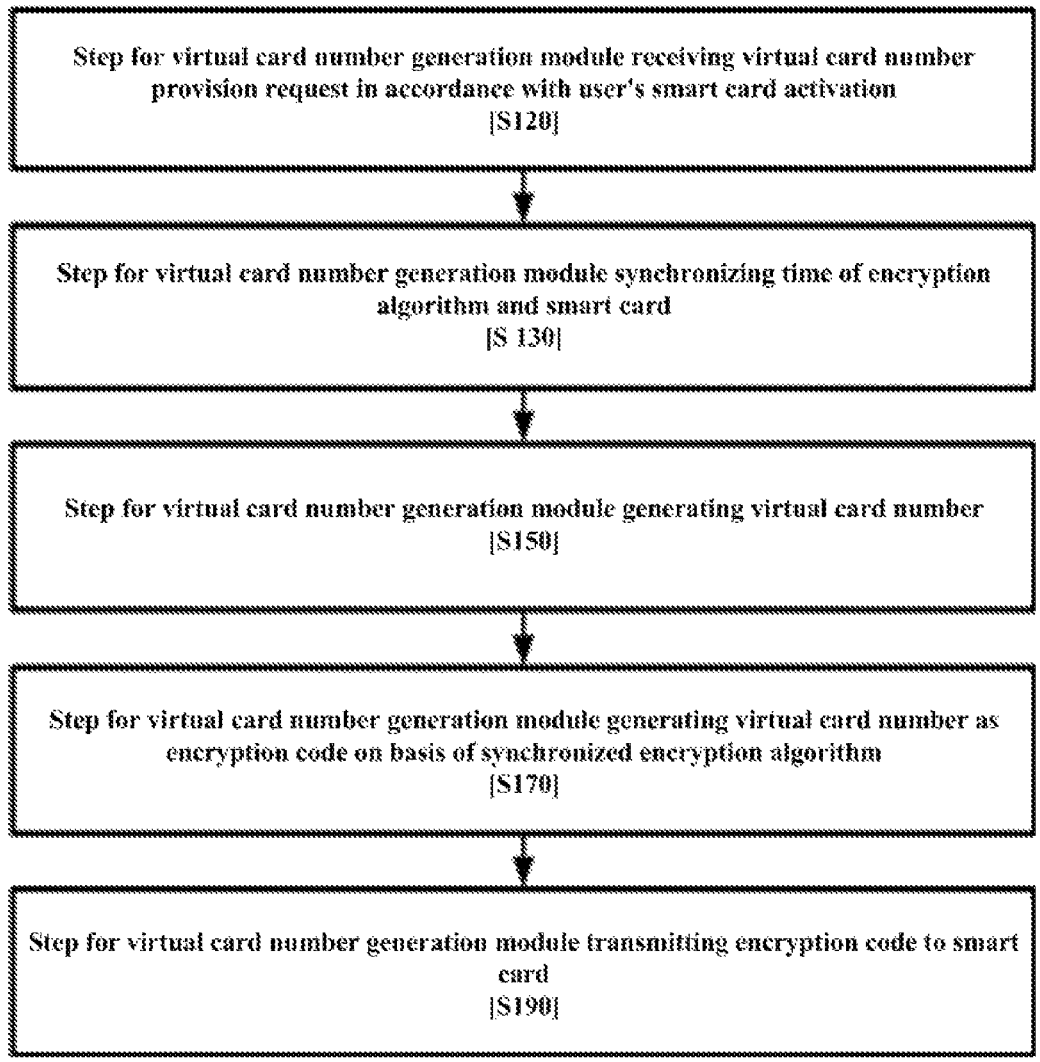
FIG. 3 is a flowchart of a smart card-based virtual card number providing method, according to an exemplary embodiment of the inventive concept.

FIG. 3 is a flowchart of a smart card-based virtual card number providing method, according to an exemplary embodiment of the inventive concept.

Referring to FIGS. 2 and 3, a smart card-based virtual card number providing method according to an exemplary embodiment of the inventive concept includes a step (S120)

for the virtual card number generation module 100 receiving a virtual card number provision request in accordance with the activation of the smart card 20 of a user, a step (S130) for the virtual card number generation module 100 synchronizing the time of an encryption algorithm with the smart card 20, a virtual card number generating step (S150) for the virtual card number generation module 100 generating a virtual card number, a step (S170) for the virtual card number generation module 100 generating the virtual card number as an encryption code on the basis of the synchronized encryption algorithm, and a step (S190) for the virtual card number generation module 100 transmitting the encryption code to the smart card 20. The virtual card number is generated per unit count by means of a virtual card number generation function. Hereinafter, the detailed description of each operation is provided.

In S120, the virtual card number generation module 100 receives a virtual card number provision request in accordance with the activation of a user's smart card. That is, when the user manipulates (e.g., the manipulation of pressing a button on the smart card 20 or moving the smart card 20) the smart card 20 to use the smart card 20, the smart card 20 immediately transmits the virtual card number provision request to the application including the virtual card number generation module 100. Because the smart card 20 operates in conjunction with the application for generating a virtual card number installed in a specific mobile terminal 10, the virtual card number generation module 100 may immediately receive a virtual card number provision request data through wireless communication (e.g., Bluetooth) without additional manipulation to the smart card 20. In this way, the user may make a financial transaction with a virtual card number without a process added to the conventional using method of providing a card to a counterpart to make a financial transaction with a normal card.

In S130, the virtual card number generation module 100 synchronizes the time of an encryption algorithm with the smart card 20. The virtual card number generation module 100 and the smart card 20 include the same encryption algorithm; the virtual card number generation module 100 generates a virtual card number as an encryption code as described below; the smart card 20 decrypts the received encryption code and restores the virtual card number.

The virtual card number generation module 100 and the smart card 20 may change the encryption algorithm depending on a specific rule to prevent others from finding out the encryption algorithm by obtaining a plurality of encryption codes provided from the virtual card number generation module 100 to the smart card 20. That is, when the virtual card number generation module 100 receives the virtual card number generation request, the virtual card number generation module 100 synchronizes time with the smart card 20 such that the virtual card number generation module 100 and the smart card 20 perform conversion and restoration with the same encryption pattern. For example, the virtual card number generation module 100 may perform synchronization to be matched with the time data of the clock included in the smart card 20. A method of changing an encryption pattern using time data will be described later.

In S150, the virtual card number generation module 100 generates a virtual card number (a virtual card number generating step). The virtual card number generation module 100 includes a virtual card number generating function, which is the same as the virtual card number generating function included in the virtual card number verification server 30. Accordingly, the virtual card number verification server 30 (e.g., a financial company server) receives the virtual card number, which is generated by the virtual card number generation module 100 and provided to the smart card 20, to search for the actual card number and then proceed with the financial transaction.

Figure 4:
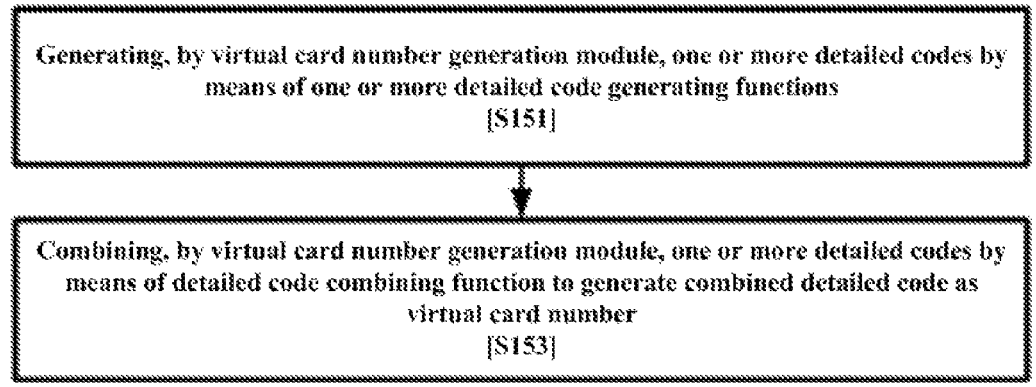
FIG. 4 is a flowchart illustrating a process of generating a virtual card number, according to an exemplary embodiment of the inventive concept.

The virtual card number generating function generates a virtual card number in various manners. For example, as illustrated in FIG. 4, the virtual card number generating step S150 includes a step S151 in which the virtual card number generation module 100 generates one or more detailed codes by means of one or more detailed code generating functions and a step S153 in which the virtual card number generation module 100 combines the one or more detailed codes by means of a detailed code combining function to generate the combined detailed code as a virtual card number. That is, the virtual card number generating function includes a detailed code generating function and a detailed code combining function.

First of all, in S151, the virtual card number generation module 100 generates one or more detailed codes by means of one or more detailed code generating functions. For example, the virtual card number generation module 100 includes a first function and a second function as detailed code generation functions to generate a first code and a second code.

In an exemplary embodiment of a method in which the virtual card number generation module 100 generates the first code and the second code, the plurality of detailed codes includes the first code for setting the start point of the storage location search of an actual card number in the virtual card number verification server 30 (e.g., a financial company server) and the second code for setting a search path from the start point to the storage location depending on the specific search method. The first code and the second code may have the correlation for searching for the storage location of the actual card number in the virtual card number verification server 30. However, the virtual card number generation device 100 may only include the first function to generate the first code and the second function as the detailed code generation functions to generate the second code to improve security, and may not include the data about the correlation between the first code and the second code.

Furthermore, according to another exemplary embodiment, the plurality of detailed codes may include a first code generated based on the first count and a second code generated based on the second count. The first count is the number of unit counts that have elapsed from the first time at which the virtual card number generating function is driven by the virtual card number verification server 30. The second count is the number of unit counts that have elapsed from a point in time at which the actual card number of a specific user is issued. That is, the first function generating the first code is a function that provides a specific code value corresponding to the first count. The second function generating the second code is a function that provides a specific code value corresponding to the second count.

In this way, it is possible to prevent duplicate virtual card numbers from occurring regardless of the time of generation of a virtual card number and a user. The first code is set to one (e.g., a code value corresponding to the time (or count) at when the generation of a virtual card number is requested) of the code values matched for each count from the initial time when the first function is driven in the virtual card number verification server 30. The virtual card number generation module 100 generates a code value, which is different for each generation time of a virtual card number in the same user, as the first code. In addition, the virtual card number generation module 100 always has a second count value, which is different for each virtual card number generation module 100 at the same time, such that the actual card number is not issued at the same point in time. The virtual card number generation module 100 always generates the second code, which is different for each user at the same point in time. That is, the first code has a code value different for each count, and the second code has a code value different for each virtual card number generation module 100 (i.e., an app card application installed in the mobile terminal 10 of each user) of each user at the same point in time. Accordingly, the virtual card number obtained by combining the first code and the second code is outputted as a code value that is not duplicated regardless of a user and a virtual card number generation request time point.

In another exemplary embodiment, the virtual card number generation module 100 (i.e., the second virtual card number generation module 120) generates the first code and the second code, using a virtual security code. That is, the second virtual card number generation module 120 applies the virtual security code as the second count or the number of counts elapsed from the current point in time. At this time, the second virtual card number generation module 120 generates the first code by applying the number of counts plus the count (i.e., the count that is on the basis of the generation of the second code) corresponding to the actual card number issuance time to the virtual security code as the first count. A method of generating the first code and the second code using a virtual security code will be described later in detail.

In S153, the virtual card number generation module 100 combines the one or more detailed codes by means of a detailed code combining function to generate the combined detailed code as a virtual card number. Various methods may be applied to the method of generating one virtual card number by combining the plurality of detailed codes. As the example of the detailed code combining function, virtual card number generation module 100 may generate the virtual card number in the manner of alternately positioning the first code of N-digits and the second code of N-digits. Furthermore, for another example, the detailed code combining function may be a function that combines the second code behind the first code. As the length of the detailed code included in a virtual function increases, the detailed code combining function may be generated variously.

In S170, the virtual card number generation module 100 generates the virtual card number as an encryption code on the basis of the synchronized encryption algorithm. That is, the virtual card number generation module 100 generates the virtual card number as an encryption code based on a conversion pattern (i.e., an encryption pattern) corresponding to a point in time when the smart card 20 is synchronized.

In S190, the virtual card number generation module 100 transmits the encryption code to the smart card 20. At this time, the virtual card number generation module 100 may transmit the encryption code through various communication schemes.

Figure 5:
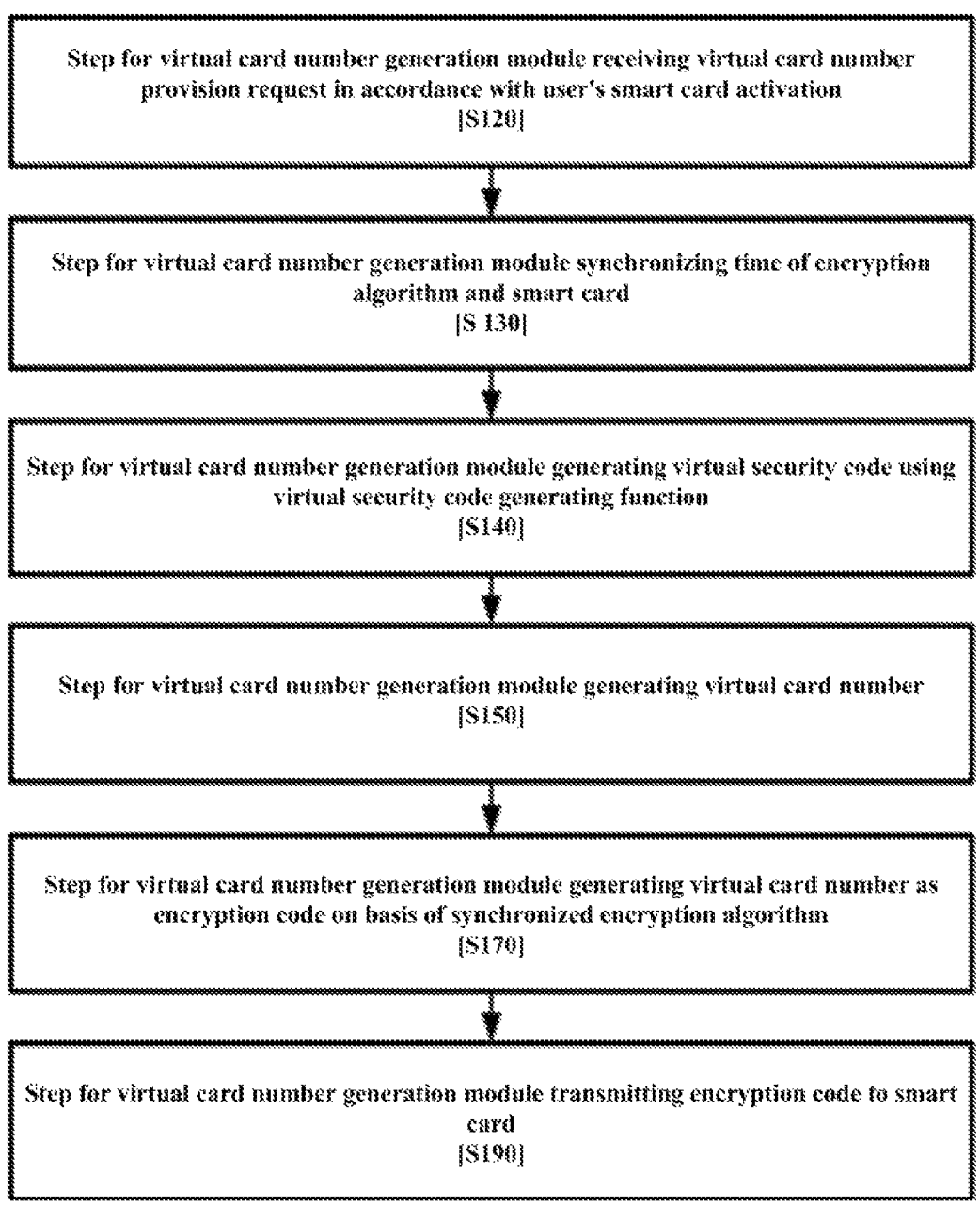
FIG. 5 is a flowchart of a smart card-based virtual card number providing method generating a virtual card number based on a virtual security code, according to an exemplary embodiment of the inventive concept.

Moreover, in another exemplary embodiment, as illustrated in FIG. 5, a step S140 in which the virtual card number generation module 100 generates a virtual security code using a virtual security code generating function may be further included. That is, the virtual card number generation module 100 included in an application in the mobile terminal 10 further includes a first virtual card number generation module 110 generating a virtual security code used to generate a detailed code together with the second virtual card number generation module 120 including a virtual card number generating function. The first virtual card number generation module 110 includes a virtual security code generating function.

According to an exemplary embodiment, the virtual security code is a one-time code generated using time data (i.e., virtual card number generation request time point), a card unique value, and the card security code (i.e., CVC or CVV of the actual card number) of the actual card number. The card unique value means a unique value assigned to an application (e.g., an app card application) installed in the mobile terminal 10. That is, the card unique value is the value assigned when an app card application is provided for installation from the financial company server or an application provider server (e.g., an app store server) to the mobile terminal 10. The first virtual card number generation module 110 may internally store the card unique value and the card security code to generate the virtual security code.

Also, in another exemplary embodiment, the first virtual card number generation module 110 generates the virtual security code, using the One Time Password (OTP) (user authentication using the randomly generated OTP instead of a fixed password) method. That is, the first virtual card number generation module 110 generates OTP using time data (i.e., virtual card number generation request time point), a card unique value, and the card security code (i.e., CVC or CVV of the actual card number) of the actual card number, as key data.

The second virtual card number generation module 120 generates each detailed code, using the virtual security code. That is, the second virtual card number generation module 120 applies the virtual security code as the second count (i.e., the number of counts shifted from a point in time when an actual card number is issued) or the number of counts (i.e., the number of counts shifted from the current point in time) elapsed from the current point in time. At this time, the second virtual card number generation module 120 generates the first code by applying the number of counts plus the count (i.e., the count that is on the basis of the generation of the second code) corresponding to the actual card number issuance time to the virtual security code as the first count. In this way, it is impossible for other people to identify the order (i.e., the first function and second function) in which the first code and the second code constituting the virtual card number, thereby improving the security.

Furthermore, in another exemplary embodiment, the virtual security code is used to identify that the virtual card number transmitted through the smart card 20 is normally generated in the virtual card number verification server 30. That is, the virtual card number verification server 30 receives the virtual card number obtained by a financial transaction terminal and then extracts the virtual security code (i.e., a reception virtual security code) included in the virtual card number; and then, the virtual card number verification server 30 determines whether the virtual card number is normal, by determining whether the reception virtual security code is normally generated at the time of the financial transaction request based on the information (i.e., a virtual security code generating function, a card unique value, and a card security code of an actual card number) stored in the virtual card number verification server. The method of verifying the virtual card number varies depending on a method of using the virtual security code when a detailed code is generated.

In an exemplary embodiment, after extracting the virtual security code from the second code generated based on the virtual security code, the virtual card number verification server 30 may determine whether there is a value the same as the virtual security code among the OTP numbers calculated by entering the count within a specific range from the count, at which the virtual code is received, by means of a virtual security code generating function (i.e., OTP function). The virtual card number verification server 30 obtains the virtual security code value (i.e., an OTP function value) used to generate the second code by applying the inverse function of the second function to the second code and searches for the count at which a value the same as the virtual security code value is calculated. As the difference between a time point at which the virtual security code is generated by the virtual card number generation module 100 and a time point at which the virtual card number verification server 30 receives the virtual security code is present due to the transmission time of the virtual card number or delay, the count at which the virtual card number verification server 30 receives the virtual card number may not be the same as a count at which the OTP number corresponding to the virtual security code is generated, and thus the virtual card number verification server 30 allows an error range from the count at which the virtual card number is received. In this way, the virtual card number verification server 30 may verify whether the virtual card number verification server 100 transmitting the virtual card number is normally matched with the actual card number, thereby improving the security.

Moreover, according to another exemplary embodiment, the virtual card number generation module 100 may generate the first code corresponding to the count obtained by adding the virtual security code value generated based on the unique value and the card security code within the virtual card number generation device at a point in time when the financial transaction is requested and may generate the second code corresponding to the count obtained by adding the value of the virtual security code and the count difference between the actual card number issuance time point ('A' time point) and the financial transaction request time point ('C' time point). That is, the equation in which the virtual card number generation module 100 generates the first and second codes by using the first function and the second function is as follows.

First code=$f_1$(count at time point 'C'+virtual security code)

Second code=$f_2$(count at time point 'C'−count at time point 'A'+virtual security code)

(Time point 'A': a time point at which an actual card number is issued, time point 'C': a count at a time point of financial transaction request, virtual security code: OTP number)

The virtual card number verification server 30 searches for the storage location of the actual card number based on the first code and the second code within the received virtual card number and extracts the card security code (i.e., CVV or CVC) included in the storage location of the actual card number and the unique value of the virtual card number generation module 100. The virtual card number verification server 30 generates a virtual security code (i.e., an OTP number) based on the card security code and the unique value within a specific count range from a time point at which a financial transaction request is received. Afterward, the virtual card number verification server 30 may determine whether there is a count at which the number of counts (i.e., a value obtained by applying the inverse function of the second function to the second code) corresponding to the second code is the same as the sum of the number of counts to each count within a specific count range from a time point when the financial transaction request is received from the actual card number issuance time point ('A' time point) and the virtual security code (i.e., OTP number). As the virtual card number verification server 30 searches for the point with which the storage space of the actual card number is matched, based on the first code and the second code, the virtual card number verification server 30 grasps the issuance time point of the actual card number. In this way, the virtual card number verification server 30 may determine whether the virtual card number generation module 100 providing a virtual card number is issued normally.

Also, in another exemplary embodiment, a step S100 in which the virtual card number generation module 100 obtains the identification value of the smart card 20 during the usage registration of the smart card 20 may be further included. The identification value is a serial number assigned to the smart card 20. The identification value is used for encryption (i.e., code conversion) for data transmission between the smart card 20 and the application linked with the smart card 20. For example, the virtual card number generation module 100 provides a usage registration interface on the screen of the mobile terminal 10 and receives an identification value of the smart card 20 from a user. In this way, the virtual card number generation module 100 receives and stores the identification value stored inside the smart card 20.

Figure 6:
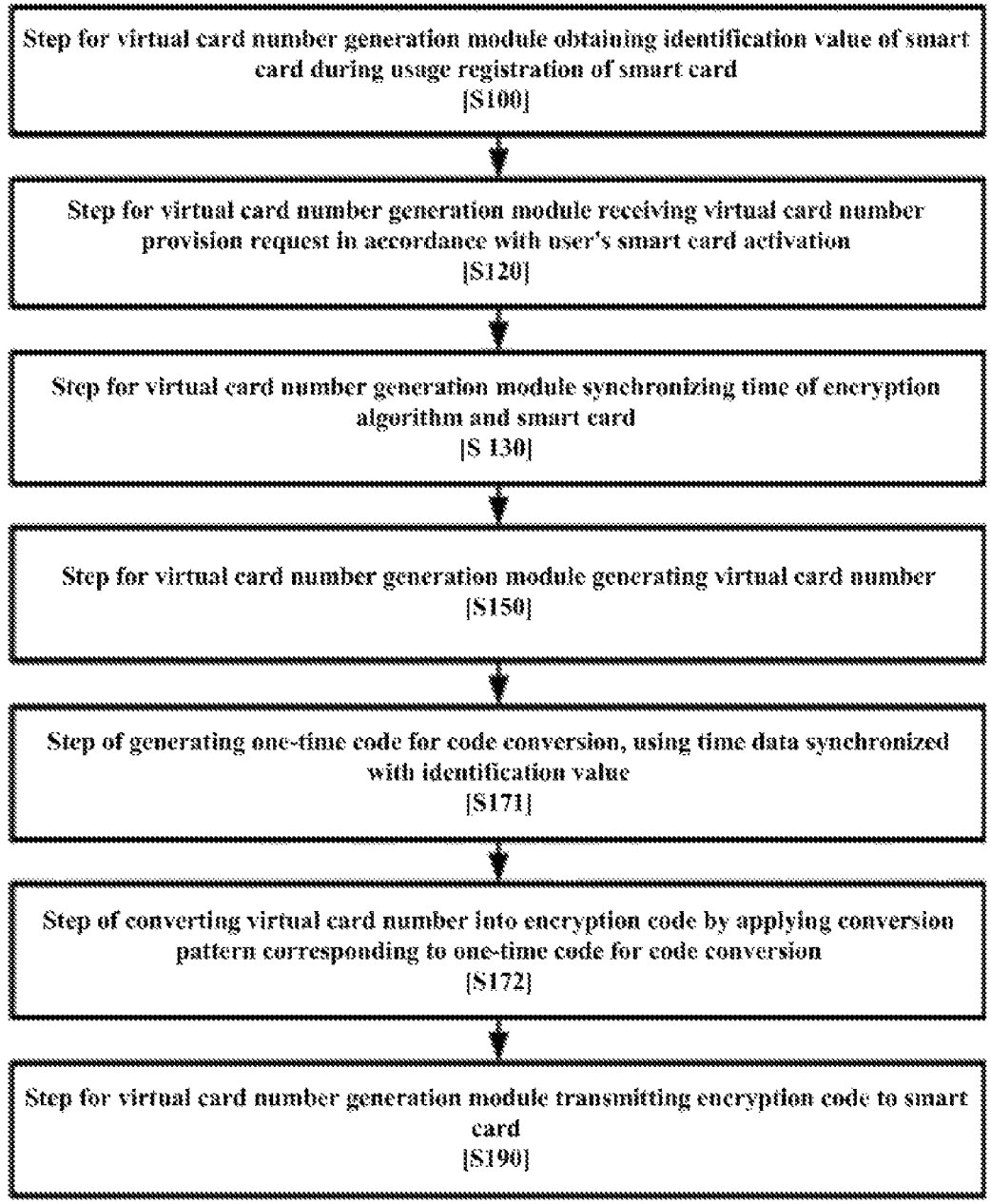
FIG. 6 is a flowchart of a smart card-based virtual card number providing method that converts a virtual card number into an encryption code by means of a one-time code for code conversion generated based on a smart card identification value, according to an exemplary embodiment of the inventive concept.

In particular, as illustrated in FIG. 6, the encryption code generating step S170 generates a one-time code for code conversion, using time data synchronized with the identification value in S171 and converts the virtual card number into an encryption code by applying a conversion pattern corresponding to the one-time code for code conversion in S172. The virtual card number generation module 100 may include various rules (i.e., encryption rules) for generating the virtual card number as an encryption code and may generate the encryption code by applying an encryption rule corresponding to the one-time code for code conversion value generated at virtual card number generation time point. In this way, even though other people find out the time data synchronized between the application and the smart card 20 and the identification value of the smart card 20, but do not find out an algorithm generating a one-time code for code conversion, the other people fail to restore the encryption code to the virtual card number; when other people do not find out the matching relationship between the one-time code for code conversion and a conversion pattern (or an encryption rule), the other people fail to restore the encryption code to the virtual card number.

In addition, as the one-time code for code conversion changed every time is used as key data used for encryption and decryption, it is possible to prevent other people from restoring the encryption code as the virtual card number when the key data is leaked. That is, the decryption modules in the virtual card number generation module 100 and the smart card 20 may perform encryption and decryption using the one-time code for code conversion randomly generated by an OTP function at each time point, and thus it is impossible for other people to grasp the key data used for encryption and decryption at a specific point in time. In the conventional encryption method, other people may decrypt the encryption code because the key data used for encryption and decryption is fixed. However, in this way, the problem of the conventional encryption method may be resolved.

Moreover, in another exemplary embodiment, when the registration of the smart card 20 is requested, the virtual card number generation module 100 may provide installation data to the smart card 20. The installation data may include a decryption module that decrypts the virtual card number encrypted by the virtual card number generation module 100 included in the application in the mobile terminal 10.

Figure 7:
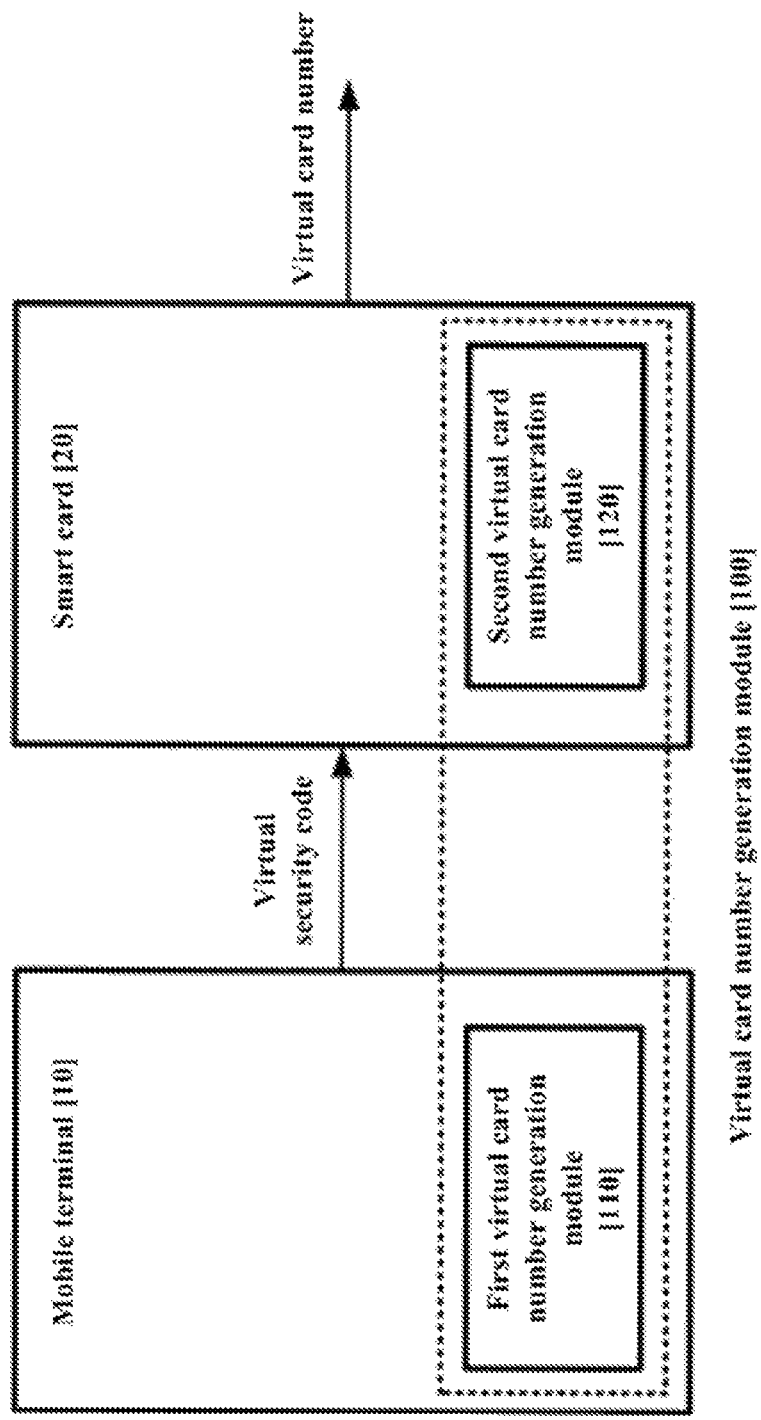
FIG. 7 is a system configuration diagram between a mobile terminal and a smart card according to another exemplary embodiment of the inventive concept.

FIG. 7 is a system configuration diagram between the mobile terminal 10 and the smart card 20, according to another exemplary embodiment of the inventive concept.

Figure 8:
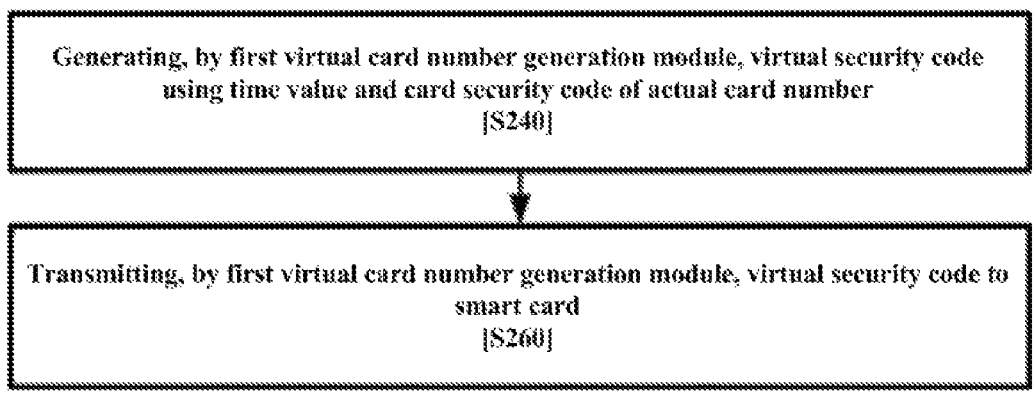
FIG. 8 is a flowchart of a smart card-based virtual card number providing method, according to another exemplary embodiment of the inventive concept.

FIG. 8 is a flowchart of a smart card-based virtual card number providing method, according to another exemplary embodiment of the inventive concept.

Referring to FIGS. 7 and 8, according to another exemplary embodiment of the inventive concept, a smart card-based virtual card number providing method further include a step S240 (a virtual security code generating step) in which the first virtual card number generation module 110 generates a virtual security code using a time value and the card security code of an actual card number and a step S260 in which the first virtual card number generation module 110 transmits the virtual security code to the smart card 20. Hereinafter, the detailed description of each operation is provided.

For the purpose of generating and outputting a virtual card number, there is a need for the first virtual card number generation module 110 generating a virtual security code used to generate a virtual card number and the second virtual card number generation module 120 generating a virtual card number through a virtual card number generating function. In the inventive concept, there is a method in which an application installed in the mobile terminal 10 includes only the first virtual card number generation module 110 and the smart card 20 includes the second virtual card number generation module 120 by separating the device including the first virtual card number generation module 110 and the second virtual card number generation module 120.

In S240, the first virtual card number generation module 110 generates a virtual security code, using a time value and the card security code of an actual card number (a virtual security code generating step). The first virtual card number generation module 110 may be included in an application installed in the mobile terminal 10 and may include a virtual security code generating function.

According to an exemplary embodiment, the virtual security code is a one-time code generated using time data (i.e., virtual card number generation request time point), a card unique value, and the card security code (i.e., CVC or CVV of the actual card number) of the actual card number. The card unique value means a unique value assigned to an application (e.g., an app card application) installed in the mobile terminal 10. That is, the card unique value is the value assigned when an app card application is provided for installation from the financial company server or an application provider server (e.g., an app store server) to the mobile terminal 10. The first virtual card number generation module 110 may internally store the card unique value and the card security code to generate the virtual security code.

Also, in another exemplary embodiment, the first virtual card number generation module 110 generates the virtual security code, using the One Time Password (OTP) (user authentication using the randomly generated OTP instead of a fixed password) method. That is, the first virtual card number generation module 110 generates OTP using time data (i.e., virtual card number generation request time point), a card unique value, and the card security code (i.e., CVC or CVV of the actual card number) of the actual card number, as key data.

In S260, the first virtual card number generation module 110 transmits the virtual security code to the smart card 20. The first virtual card number generation module 110 encrypts and transmits the virtual security code, using the identification value (i.e., the serial number of the smart card 20) of the smart card 20, which is received at the time of registration of the smart card 20, as key data. The smart card 20 receiving the encrypted virtual security code identifies the virtual security code by performing decryption based on the identification value of the smart card 20 stored therein.

The second virtual card number generation module 120 included in the smart card 20 generates a plurality of detailed codes matched with the unit count, at which the generation of the virtual card number is requested, using the virtual security code received from the first virtual card number generation module 110 in the application. That is, the virtual security code may not be output to the outside by a virtual card number generation means and may be reflected to generate the first code and the second code. In addition, the second virtual card number generation module 120 generates a virtual card number by combining the plurality of detailed codes and outputs the virtual card number to the outside.

The plurality of detailed codes may include a first code generated based on the first count and a second code generated based on the second count. The first count is the number of unit counts that have elapsed from the first time at which the virtual card number generating function is driven by the virtual card number verification server 30. The second count is the number of unit counts that have elapsed from a point in time at which the actual card number of a specific user is issued. That is, the first function generating the first code is a function that provides a specific code value corresponding to the first count. The second function generating the second code is a function that provides a specific code value corresponding to the second count.

That is, the second virtual card number generation module 120 applies the virtual security code as the second count (i.e., the number of counts shifted from a point in time when an actual card number is issued) or the number of counts (i.e., the number of counts shifted from the current point in time) elapsed from the current point in time. At this time, the second virtual card number generation module 120 generates the first code by applying the number of counts plus the count (i.e., the count that is on the basis of the generation of the second code) corresponding to the actual card number issuance time to the virtual security code as the first count.

Figure 9:
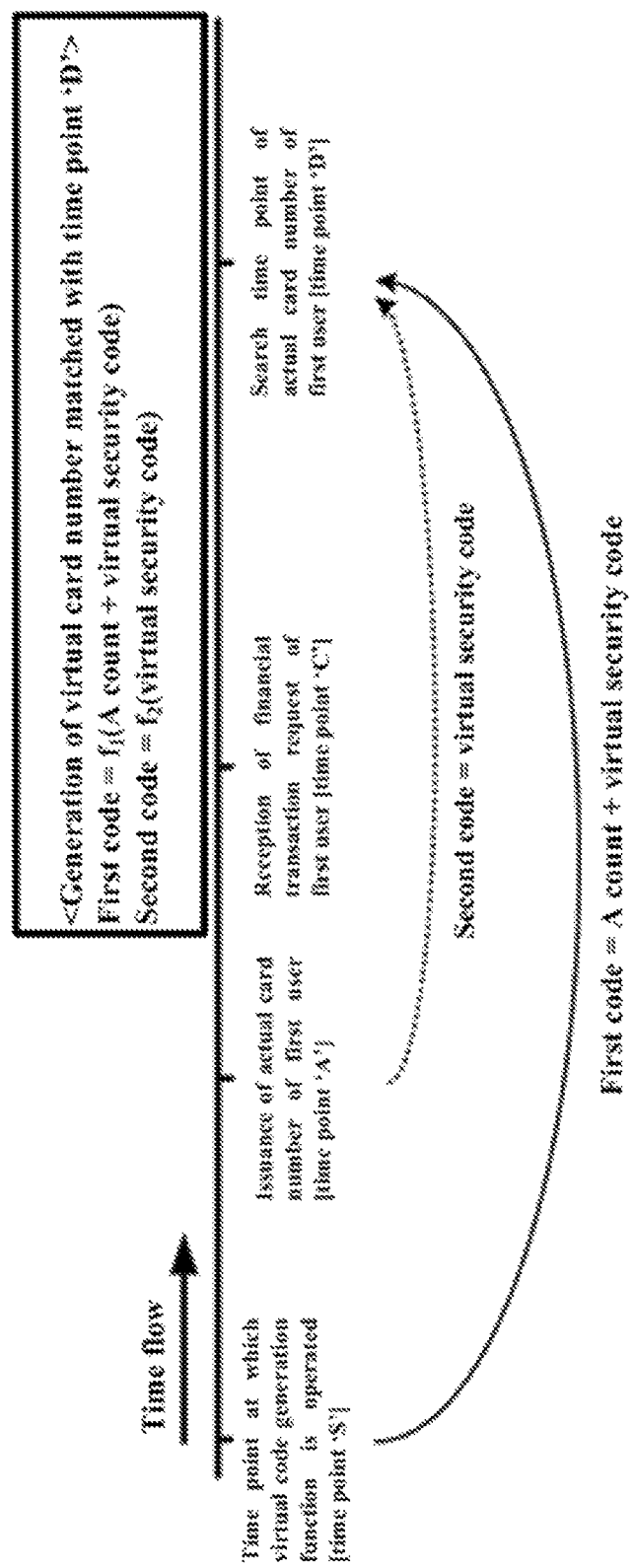
FIG. 9 is an exemplary view of a process of generating a virtual card number by applying a virtual security code to a second count, according to an exemplary embodiment of the inventive concept.

In particular, as illustrated in FIG. 9, the second virtual card number generation module 120 generates the first code corresponding to a count obtained by adding the virtual security code to the actual card number issuance time point and generates the second code of a count corresponding to the virtual security code value. That is, the first code and the second code are generated based on the count shifted by the virtual security code from a time point 'A' at which the actual card number is issued to a first user. The count shifted from the time point 'A' may be a count earlier or later than the count corresponding to the present time point depending on the generated virtual security code value. In this way, it is impossible for other people to identify the order (i.e., the first function and second function) in which the first code and the second code constituting the virtual card number, thereby improving the security.

Furthermore, when the second virtual card number generation module 120 in the smart card 20 applies (i.e., apply the virtual security code value as the second count) the virtual security code value based on a count at the actual card number issuance time point to generate the first code and the second code, the smart card 20 does not need to obtain time data, and thus it is not necessary to have a clock inside the device. In this way, it is possible to eliminate the consumption of a battery with the smart card 20 operates a clock.

Furthermore, in another exemplary embodiment, the virtual security code is used to identify that the virtual card number transmitted through the smart card 20 is normally generated in the virtual card number verification server 30. That is, the virtual card number verification server 30 receives the virtual card number obtained by a financial transaction terminal and then extracts the virtual security code (i.e., a reception virtual security code) included in the virtual card number; and then, the virtual card number verification server 30 determines whether the virtual card number is normal, by determining whether the reception virtual security code is normally generated at the time of the financial transaction request based on the information (i.e., a virtual security code generating function, a card unique value, and a card security code of an actual card number) stored in the virtual card number verification server.

For example, when the virtual security code is used as the second count (i.e., when a clock for identifying the current time is not included in the smart card 20), after extracting the virtual security code from the second code generated based on the virtual security code, the virtual card number verification server 30 (i.e., a financial company server) may determine whether there is a value the same as the virtual security code among the OTP numbers calculated by entering the count within a specific range from the count, at which the virtual code is received, by means of a virtual security code generating function (i.e., OTP function). The virtual card number verification server 30 (i.e., a financial company server) obtains the virtual security code value (i.e., an OTP function value) used to generate the second code by applying the inverse function of the second function to the second code and searches for the count at which a value the same as the virtual security code value is calculated. As the difference between a time point at which the virtual security code is generated by a virtual card number generation means and a time point at which the virtual card number verification server 30 receives the virtual security code is present due to the transmission time of the virtual card number or delay, the count at which the virtual card number verification server 30 receives the virtual card number may not be the same as a count at which the OTP number corresponding to the virtual security code is generated, and thus the virtual card number verification server 30 allows an error range from the count at which the virtual card number is received. In this way, when other people does not obtain the normal virtual security code in real time even though the other people hack the second virtual card number generation module 120 to find out the first function and the second function, the other people fail to generate a virtual card number matched with the financial transaction request time point.

Figure 10:
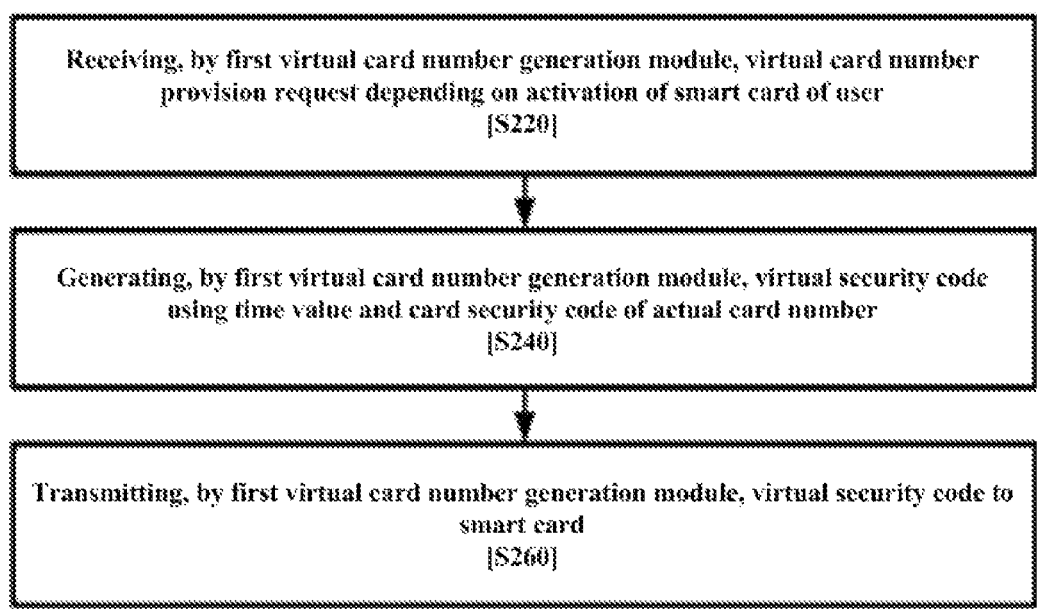
FIG. 10 is a flowchart of a smart card-based virtual card number providing method further including a process of receiving a virtual card number provision request in accordance with activation of a smart card, according to an exemplary embodiment of the inventive concept.

Furthermore, in another exemplary embodiment, as illustrated in FIG. 10, a step S220 in which the first virtual card number generation module 110 receives a virtual card number provision request depending on the activation of the smart card 20 of a user is further included. At this time, the virtual card number provision request received from the smart card 20 by the first virtual card number generation module 110 refers to a request for providing the virtual security code required for the second virtual card number generation module 120 in the smart card 20 to generate the virtual card number. When the user manipulates (e.g., the manipulation of pressing a button on the smart card 20 or moving the smart card 20) the smart card 20 to use the smart card 20, the smart card 20 immediately transmits the virtual card number provision request to the application including the virtual card number generation module 100. Because the smart card 20 operates in conjunction with the application for generating a virtual card number installed in a specific mobile terminal 10, the virtual card number generation module 100 may immediately receive a virtual card number provision request data through wireless communication (e.g., Bluetooth) without additional manipulation to the smart card 20. In this way, the user may make a financial transaction with a virtual card number without a process added to the conventional using method of providing a card to a counterpart to make a financial transaction with a normal card.

Figure 11:
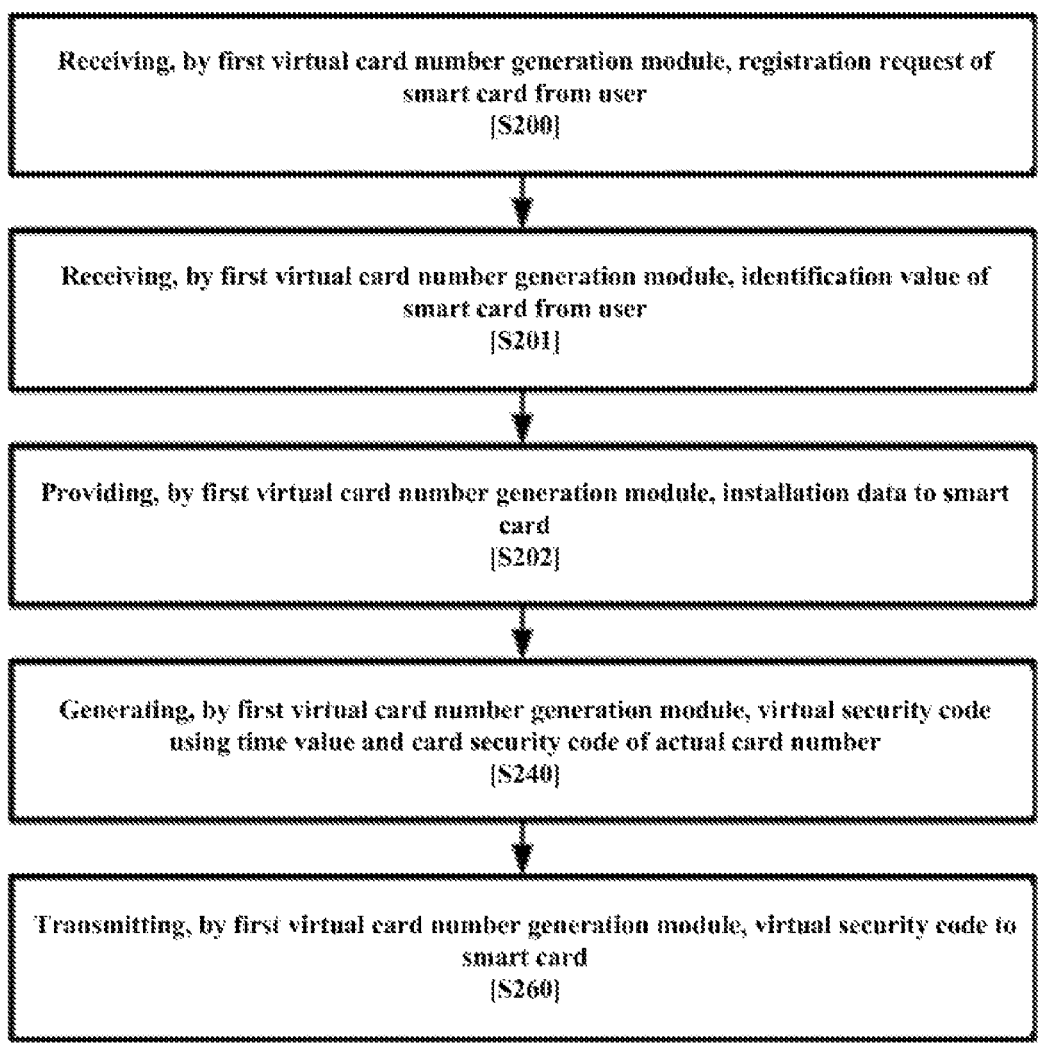
FIG. 11 is a flowchart of a smart card-based virtual card number providing method further including a process of providing installation data of a second virtual card number generation module to a smart card through a process of registering a smart card, according to an exemplary embodiment of the inventive concept.

Furthermore, in another exemplary embodiment, as illustrated in FIG. 11, a step S200 in which the first virtual card number generation module 110 receives the registration request of the smart card 20 from a user, a step S201 in which the first virtual card number generation module 110 receives the identification value of the smart card 20 from the user, and a step S202 in which the first virtual card number generation module 110 provides installation data to the smart card 20 are further included. The installation data includes the second virtual card number generation module 120. That is, the application receives the installation data needed to install the second virtual card number generation module 120 in the smart card 20 when being installed in the mobile terminal 10 and provides the installation data to the smart card 20 through wireless communication upon registering the specific smart card 20.

In the process of providing installation data for the second virtual card number generation module 120 from the application to the smart card 20, other people fail to generate a virtual security code matched with the financial transaction request time point even though the installation data is stolen by other people, and thus the other people may not generate a virtual card number matched with the financial transaction request time point. Accordingly, the financial transaction may be made. That is, the installation data of the second virtual card number generation module 120 includes only the information about the virtual card number generating function and a point in time (i.e., the actual card number issuance time point) when a user receives the issuance of the actual card number and does not include a card security code, a card unique value, and a virtual security code generating function (i.e., an OTP function) required to generate the virtual security code required to generate the first code and second code by means of a virtual card number generating function, and thus the other people who have stolen the installation data may not generate the virtual card number matched with the financial transaction request time point. Therefore, even though the installation data of the second virtual card number generation module 120 is provided through wireless communication, the high security may be provided.

Figure 12:
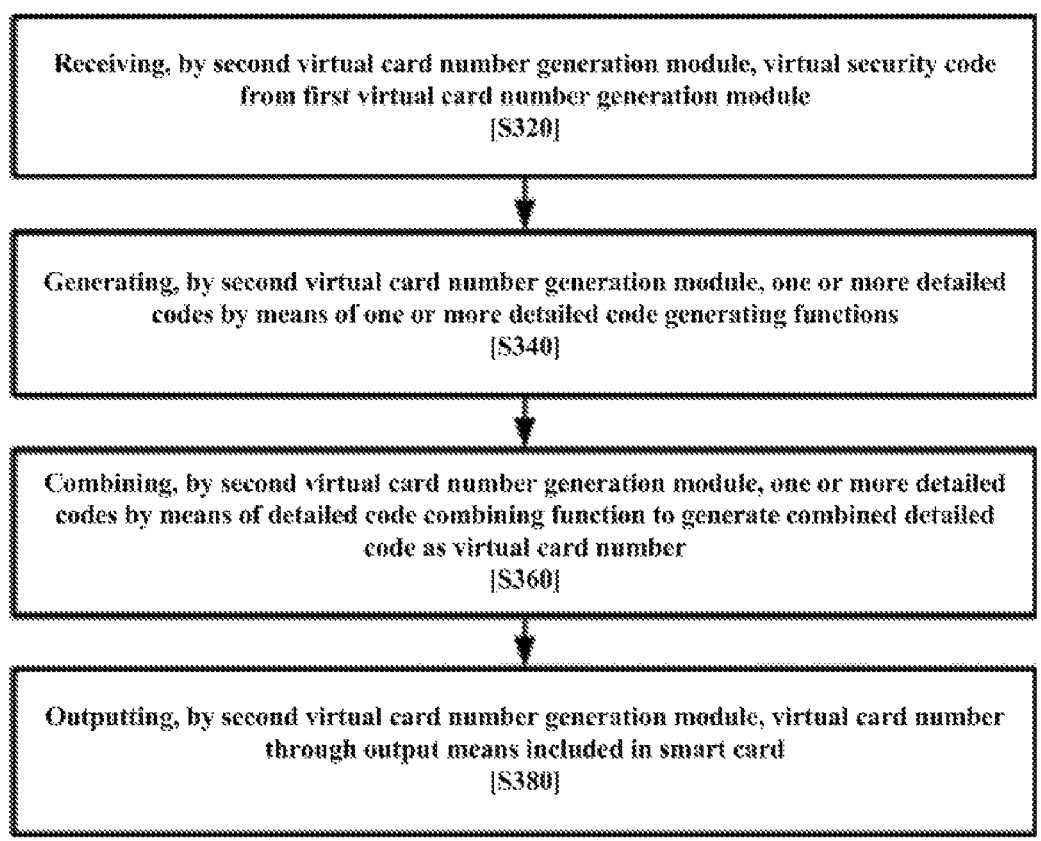
FIG. 12 is a flowchart of a smart card-based virtual card number providing method, according to still another exemplary embodiment of the inventive concept.

FIG. 12 is a flowchart of a smart card-based virtual card number providing method, according to still another exemplary embodiment of the inventive concept.

Referring to FIGS. 7 and 12, according to still another exemplary embodiment of the inventive concept, a smart card-based virtual card number providing method includes a card security code receiving step S320 in which the second virtual card number generation module 120 receives a virtual security code from the first virtual card number generation module 110, a step S340 in which the second virtual card number generation module 120 generates one or more detailed codes by means of one or more detailed code generating functions, a step S360 in which the second virtual card number generation module 120 combines the one or more detailed codes by means of a detailed code combining function to generate a virtual card number, and a step S380 in which the second virtual card number generation module 120 outputs the virtual card number through an output means included in the smart card 20. The detailed description of each step is omitted.

For the purpose of generating and outputting a virtual card number, there is a need for the first virtual card number generation module 110 generating a virtual security code used to generate a virtual card number and the second virtual card number generation module 120 generating a virtual card number through a virtual card number generating function. The inventive concept refers to a process performed by the second virtual card number generation module 120 in the smart card 20, as a method in which an application installed in the mobile terminal 10 includes only the first virtual card number generation module 110 and the smart card 20 includes the second virtual card number generation module 120 by separating the device including the first virtual card number generation module 110 and the second virtual card number generation module 120.

In S320, the second virtual card number generation module 120 receives a virtual security code from the first virtual card number generation module 110 (a card security code receiving step). The second virtual card number generation module 120 receives the virtual security code generated in real time through wireless communication by the first virtual card number generation module 110. The second virtual card number generation module 120 includes a virtual card number generating function the same as a virtual card number generating function included in the virtual card number verification server 30 and is installed in the smart card 20 by the installation data provided from the application to the smart card 20.

In S340, the second virtual card number generation module generates one or more detailed codes by means of one or more detailed code generating functions. (The same as S151). In an exemplary embodiment, the plurality of detailed codes may include a first code generated based on the first count and a second code generated based on the second count. The first count is the number of unit counts that have elapsed from the first time at which the virtual card number generating function is driven by the virtual card number verification server 30. The second count is the number of unit counts elapsing from a point in time at which an actual card number of a specific user is issued. The detailed code generating step S340 applies the virtual security code as the second count or the number of counts elapsed from the current point in time.

In S360, the second virtual card number generation module 120 combines the one or more detailed codes by means of a detailed code combining function to generate the combined detailed code as a virtual card number (The same as S153).

In S380, the second virtual card number generation module 120 outputs the virtual card number through an output means included in the smart card 20. When the smart card 20 provides a virtual card number through a specific output means to the POS device, the virtual card number verification server 30 (i.e., a financial company server) receives the virtual card number through the previously established process (i.e., a procedure provided by a PG server).

Also, in another exemplary embodiment, the virtual card number is generated by combining a fixed code and a plurality of detailed codes depending on a specific rule. The fixed code is a code that is combined at the predetermined location in the virtual card number and determines the card issuer or the card type corresponding to the actual card number. That is, virtual card number may include the unchanged fixed code for distinguishing groups, together with a plurality of detailed codes. The virtual card number verification server 30 may include a plurality of virtual card number generating functions respectively corresponding to a plurality of card types; when a user needs to know the card issuer and card type of a card to be used for the financial transaction, the virtual card number verification server 30 may extract a specific virtual card number generating function to search for the actual card number. When the whole code includes only the detailed code newly generated whenever a unit count elapses without including the fixed code, a card type to be used by a user for financial transactions may not be determined without separate information. Accordingly, the second virtual card number generation module 120 includes the unchanged fixed code for identifying a card issuer and a card type. For example, the second virtual card number generation module 120 uses the first six digits, which indicate a card issuer and a card type, in the card number as a fixed code.

Moreover, the fixed code may be combined at the predetermined location within the virtual card number. In the case where the virtual card number generating function is assigned for each card type group, the virtual card number verification server 30 may determine a card type group only when extracting the fixed code from the virtual code first. Accordingly, the fixed code may be combined at predetermined location (e.g., a location the same as the issuer identification number of the actual card number) within the virtual card number so as to be detachable without the separate function.

Figure 13:
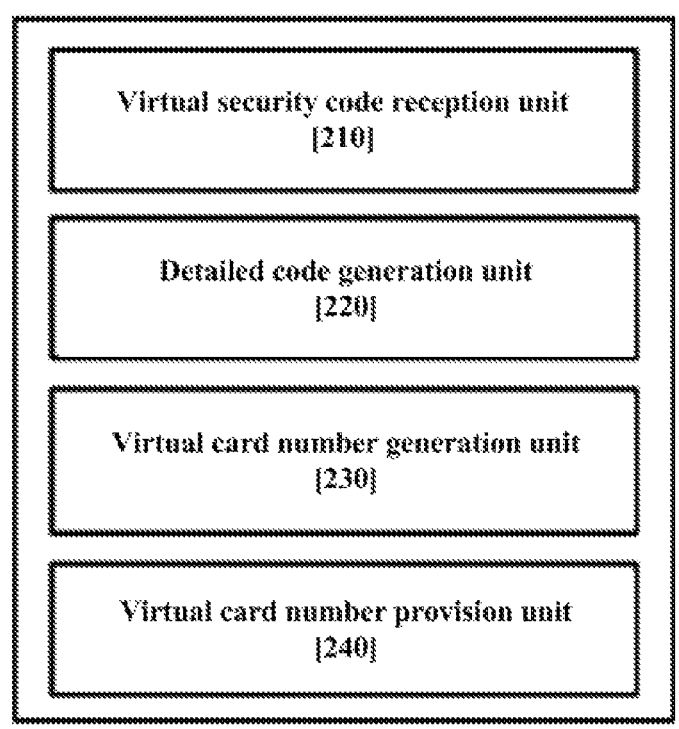
FIG. 13 is an internal configuration diagram of a smart card generating a virtual card number, according to an exemplary embodiment of the inventive concept.

FIG. 13 is an internal configuration diagram of the smart card 20 generating a virtual card number, according to an exemplary embodiment of the inventive concept.

Referring to FIG. 13, according to another exemplary embodiment of the inventive concept, the smart card 20 generating a virtual card number includes a virtual security code reception unit 210, a detailed code generation unit 220, a virtual card number generation unit 230, and a virtual card number provision unit 240. Hereinafter, contents previously described for each configuration will be omitted.

The virtual security code reception unit 210 receives a virtual security code from the mobile terminal 10.

The detailed code generation unit 220 generates one or more detailed codes based on the virtual security code. The plurality of detailed codes may include a first code generated based on the first count and a second code generated based on the second count. The first count is the number of unit counts that have elapsed from the first time at which the virtual card number generating function is driven by the virtual card number verification server 30. The second count is the number of unit counts that have elapsed from a point in time at which the actual card number of a specific user is issued. The detailed code generation unit 220 applies the virtual security code as the second count or the number of counts elapsed from the current point in time.

The virtual card number generating unit 230 combines the one or more detailed codes to generate the combined detailed code as the virtual card number.

The virtual card number provision unit 240 outputs the virtual card number to the outside to provide the virtual card number to the virtual card number verification server 30. The virtual card number provision unit 240 performs a role of outputting the virtual card number to the outside to provide the virtual card number to the virtual card number verification server 30. The virtual card number provision unit 240 may include various components capable of providing the virtual card number to the outside. The virtual card number provision unit 240 includes all or part of a wireless Internet module, a short range communication module, an IC chip 131, a magnetic field generation unit, a display unit 132, and the like.

The wireless Internet module is a module for wireless Internet access and may be embedded in a mobile terminal 100 or may be attached on the mobile terminal 100. The wireless Internet technology may include Wireless LAN (WLAN) (Wi-Fi), Wireless broadband (Wibro), World Interoperability for Microwave Access (Wimax), High Speed Downlink Packet Access (HSDPA), long term evolution (LTE), Long Term Evolution-Advanced (LTE-A), or the like.

The short range communication module refers to a module for short range communication. The short range communication technology may include Bluetooth, Bluetooth Low Energy (BLE), Beacon, Radio Frequency Identification (RFID), Near Field Communication (NFC), Infrared Data Association (IrDA), Ultra Wideband (UWB), ZigBee, or the like.

The virtual card number provision unit 240 may include a magnetic field generation unit or an IC chip. The magnetic field generation unit may transmit card data to a card reader by outputting the card data in the form of a magnetic signal. The magnetic field generation unit may include one or more magnetic cells that form a magnetic field through current flow and output the magnetic signal of card information. The magnetic field generation unit may be provided such that the magnetic field generation unit is exposed on the upper or lower surface of a PCB plate along a long side to be adjacent to the specific long side of the PCB plate of the card.

The IC chip may be mounted in PCB and may exchange data by contacting the terminal of IC card reader. That is, the IC chip delivers the virtual card number generated by the virtual card number generation unit 230 to the IC card reader.

The display unit may include at least one of a liquid crystal display, a thin film transistor-liquid crystal display, an organic light-emitting diode, a flexible display, and an E-paper.

The display unit may visually output the virtual card number generated by virtual card number generation unit 230 to the outside. In this way, the user of the smart card 20 may visually identify the generated virtual card number in real time and then may enter the visually identified virtual card number into the virtual card number verification server 30.

For example, as illustrated in FIG. 4, when the virtual card number generation device is the smart card 20, the virtual card number generation device may include a display unit capable of outputting the virtual card number without outputting the card number on the surface of the smart card 20. For example, the display unit may be an E-paper, an OLED, or the like or may be a 7-segment display provided at each position.

The smart card-based virtual card number providing method according to an exemplary embodiment of the inventive concept may be implemented by a program (or an application) and may be stored in a medium such that the program is executed in combination with a computer being hardware.

The above-described program may include a code encoded by using a computer language such as C, C++, JAVA, a machine language, or the like, which a processor (CPU) of the computer can read through the device interface of the computer, such that the computer reads the program and performs the methods implemented with the program. The code may include a functional codes associated with the function that defines functions necessary to perform the methods, and may include a control code associated with an execution procedure necessary for the processor of the computer to perform the functions in a predetermined procedure. Furthermore, the code may further include additional information necessary for the processor of the computer to perform the functions or a memory reference-related code associated with the location (address) of the internal or external memory of the computer, at which the media needs to be checked. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The stored media may mean the media that does not store data for a short period of time such as a register, a cache, a memory, or the like but semi-permanently stores to be read by the device. Specifically, for example, the stored media include, but are not limited to, ROM, RAM, CD-ROM, magnetic tape, floppy disk, optical data storage device, and the like. That is, the program may be stored in various recording media on various servers that the computer can access, or various recording media on the computer of the user. In addition, the media may be distributed to a computer system connected to a network, and a computer-readable code may be stored in a distribution manner.

Although exemplary embodiments of the inventive concept have been described herein with reference to accompanying drawings, it should be understood by those skilled in the art that the inventive concept may be embodied in other specific forms without departing from the spirit or essential features thereof. Therefore, the above-described embodiments are exemplary in all aspects, and should be construed not to be restrictive.

The inventive concept has the following various effects.

First, because a smart card does not exclusively generate a virtual card number even though the smart card making virtual card number-based payments is lost, financial accidents that others make payments using the lost smart card may be prevented.

Second, the virtual card number generation process is performed after being divided by the applications in a smart card and a mobile terminal, or the virtual card number provided by the application to the smart card is encrypted based on a special encryption algorithm between the smart card and the application. Someone may not generate or restore the virtual card number, even though the data exchanged between the smart card and the application is snatched, thereby preventing financial accidents.

Third, a user may make a virtual transaction based on a virtual card number while maintaining the same usability as the usability in the case of making payments with a normal card.

While the inventive concept has been described with reference to exemplary embodiments, it will be apparent to those skilled in the art that various changes and modifications may be made without departing from the spirit and scope of the inventive concept. Therefore, it should be understood that the above exemplary embodiments are not limiting, but illustrative.

What is claimed is:

1. A smart card-based virtual card number providing method, the method comprising:
receiving, by a virtual card number generation module, a virtual card number provision request depending on activation of a smart card of a user;
performing, by the virtual card number generation module, time synchronization according to time data of a clock included in the smart card;
identifying, by the virtual card number generation module, an encryption pattern corresponding to a synchronized time, wherein the encryption pattern is for converting non-encrypted data to be encrypted data;
receiving, by the virtual card number generation module, from a virtual card number verification server, information on a first count that is the number of unit counts elapsing from a first time at which a virtual card number generating function is driven by the virtual card number verification server, and a second code based on a second count that is the number of unit counts elapsing from a point in time at which an actual card number of a specific user is issued;
generating, by the virtual card number generation module, by means of a plurality of detailed code generating functions, a first code based on the first count, wherein the first code includes information for setting a start point of search of a storage location;
generating, by the virtual card number generation module, by means of the plurality of detailed code generating functions, a second code based on the second count, wherein the second code includes information for setting a search path from the start point to the storage location depending on a specific search method;
generating, by the virtual card number generation module, a virtual card number, by combining the first code and the second code by means of a detailed code combining function, wherein the virtual card number is generated for each unit count by means of a virtual card number generating function, which includes the plurality of detailed code generating functions and the detailed code combining function;
generating, by the virtual card number generation module, an encryption code of the virtual card number by using the encryption pattern;
transmitting, by the virtual card number generation module, the encryption code to the smart card,
wherein the virtual card number generation module is included in an application installed in a mobile terminal and includes the same virtual card number generating function as a virtual card number generating function included in the virtual card number verification server, and
wherein the unit count is set to a specific time interval and is changed as the specific time interval elapses; and
receiving by the virtual card number verification server the virtual card number;
searching, by the virtual card number verification server, for the point with which the storage location of the actual card number is matched, based on the first code and the second code from the received virtual card number, and
retrieving, by the virtual card number verification server, the actual card number, from the point.

2. The method of claim 1, further comprising:
generating, by the virtual card number generation module, a virtual security code, using a virtual security code generating function,
wherein the virtual security code is a one-time code generated using the synchronized time and a card security code of an actual card number, and
wherein the detailed code generating functions generate the detailed codes, using the virtual security code, respectively.

3. The method of claim 2, further comprising:
obtaining, by the virtual card number generation module, an identification value of the smart card during usage registration of the smart card,
wherein the generating of the virtual card number as the encryption code includes:
generating a one-time code for code conversion, using time data synchronized with the identification value; and
converting the virtual card number into the encryption code by applying a conversion pattern corresponding to the one-time code for code conversion.

* * * * *